United States Patent
Kim et al.

(10) Patent No.: US 11,434,319 B2
(45) Date of Patent: Sep. 6, 2022

(54) METHOD OF PREPARING HIGH SOLIDS CONTENT POLYMER POLYOLS HAVING LOW VISCOSITY

(71) Applicant: Korea Kumho Petrochemical Co., Ltd., Seoul (KR)

(72) Inventors: Gi Jung Kim, Pyeongtaek-si (KR); Seul Gi Kim, Seongnam-si (KR); Seung Moo Huh, Daejeon (KR); Jin Woo Park, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 230 days.

(21) Appl. No.: 16/291,618

(22) Filed: Mar. 4, 2019

(65) Prior Publication Data
US 2019/0270836 A1    Sep. 5, 2019

(30) Foreign Application Priority Data
Mar. 2, 2018   (KR) .......................... 10-2018-0025272

(51) Int. Cl.
| | | |
|---|---|---|
| C08G 18/08 | (2006.01) | |
| C08F 212/10 | (2006.01) | |
| C08G 18/48 | (2006.01) | |
| C08G 18/63 | (2006.01) | |
| C08L 25/12 | (2006.01) | |
| C08L 71/00 | (2006.01) | |
| C08F 283/06 | (2006.01) | |

(52) U.S. Cl.
CPC ........ *C08G 18/0876* (2013.01); *C08F 212/10* (2013.01); *C08G 18/0871* (2013.01); *C08G 18/48* (2013.01); *C08G 18/4829* (2013.01); *C08G 18/632* (2013.01); *C08L 25/12* (2013.01); *C08L 71/00* (2013.01); *C08L 2203/14* (2013.01)

(58) Field of Classification Search
None
See application file for complete search history.

(56) References Cited

U.S. PATENT DOCUMENTS 5,814,699 A * 9/1998 Kratz .................... C08F 290/02
                                                    525/53

FOREIGN PATENT DOCUMENTS

| JP | 2008138178 A * | 6/2008 |
| WO | 2017-172417 A1 | 10/2017 |

* cited by examiner

*Primary Examiner* — Randy P Gulakowski
*Assistant Examiner* — Ha S Nguyen
(74) *Attorney, Agent, or Firm* — Novick, Kim & Lee, PLLC; Jae Youn Kim

(57) ABSTRACT

Provided is a method of preparing a polymer polyol, including steps of: (a) polymerizing a polyol and a monomer in presence of a diluent to prepare a primary particle dispersed liquid; and (b) feeding an additional polyol and monomer into the primary particle dispersed liquid and polymerizing to prepare a secondary particle dispersed liquid.

9 Claims, 2 Drawing Sheets

(a) POLYMERIZE POLYOL AND MONOMER

PREPARE PRIMARY PARTICLE DISPERSED LIQUID (b) FEED AND POLYMERIZE ADDITIONAL POLYOL AND MONOMER

PREPARE SECONDARY PARTICLE DISPERSED LIQUID

METHOD OF PREPARING HIGH SOLIDS CONTENT POLYMER POLYOLS HAVING LOW VISCOSITY

CROSS-REFERENCE TO RELATED APPLICATION

This application claims priority to and the benefit of Korean Patent Application No. 10-2018-0025272, filed on Mar. 2, 2018, the disclosure of which is incorporated herein by reference in its entirety.

BACKGROUND

1. Field of the Invention

The present invention relates to a method of preparing a polymer polyol, and more specifically, to a method of preparing a polymer polyol having low viscosity and a high solids content.

2. Discussion of Related Art

A polymer polyol (POP), also called copolymer polyol (CPP), is generally used to enhance the hardness and air permeability of polyurethane. Recently, as the amount of polyurethane used in automobile seats, furniture and the like increases, the need for a high solids content polymer polyol (POP) exhibiting an excellent effect of increasing the hardness of polyurethane even with a small amount is growing as well. However, as the solids content of the high solids content polymer polyol increases, the viscosity of product rises sharply to result in aggregation, and thus it is difficult to produce the product.

According to an existing method of preparing a polymer polyol, a polymerizable monomer is mixed with a predetermined amount of a base polyol, and the mixture is continuously fed at a constant rate into a reactor in which the remaining base polyol is filled while a polymerization temperature is maintained to be polymerized. The above-described method of continuously feeding monomers has an advantage of effectively dispersing the heat of polymerization, but also has a disadvantage in that an increase in viscosity is large due to an increase in solids content in the polyol. Further, a low molecular weight soluble oligomer is produced in the process of monomer polymerization, thereby deteriorating the quality of the polymer polyol. It is difficult to remove the soluble oligomer due to being present in a state of being dissolved in the polymer polyol, and since the amount of the produced soluble oligomer increases proportionally to the amount of the polymerizable monomer used in polymerization, the purification time for removing the soluble oligomer is further increased as the solids content of the polymer polyol is increased.

Therefore, there is the need for a technique capable of preparing a polymer polyol having a high solids content and low viscosity by polymerizing a polyol and a polymerizable monomer. At the same time, there is the need for a technique capable of preparing a polymer polyol by which the stability of the polymer can be maintained to reduce the amount of produced soluble oligomers.

SUMMARY OF THE INVENTION

The present invention has been made to solve the above-described problems of the prior art, and an objective of the present invention is to provide a method of preparing a high solids content polymer polyol with low viscosity by using a process of feeding monomers in a distributed manner.

Another objective of the present invention is to provide a method of preparing a polymer polyol capable of suppressing excessive soluble oligomer production and controlling the solids content and viscosity of the polymer polyol by using a process of feeding an additional polyol.

According to an aspect of the present invention, there is provided a method of preparing a polymer polyol, including steps of: (a) polymerizing a polyol and a monomer in presence of a diluent to prepare a primary particle dispersed liquid; and (b) feeding an additional polyol and monomer into the primary particle dispersed liquid and polymerizing to prepare a secondary particle dispersed liquid.

In an embodiment, an average particle size of solids in the primary particle dispersed liquid may be 80 to 320 nm.

In an embodiment, a weight ratio of the monomer used in step (a) to the monomer used in step (b) may be 1:1 to 10.

In an embodiment, a weight ratio of the polyol used in step (a) to the polyol used in step (b) may be 1:1 to 5.

In an embodiment, the monomer may include an aromatic vinyl monomer and an acrylic monomer.

In an embodiment, the aromatic vinyl monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl) styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethyl ether, vinylpyridine, vinyl xylene, diphenylethylene, diphenylethylene including tertiary amines, styrene including primary, secondary, or tertiary amines, derivatives thereof and combinations of two or more thereof. In an embodiment, the acrylic monomer may be one selected from the group consisting of acrylonitrile, methacrylonitrile, ethacrylonitrile, methyl acrylate, ethyl acrylate, butyl acrylate, methyl methacrylate, ethyl methacrylate, butyl methacrylate, derivatives thereof and combinations of two or more thereof.

In an embodiment, the polyol may be a polyether polyol.

In an embodiment, the polyether polyol may have a weight average molecular weight of 1,000 to 5,000 g/mol.

In an embodiment, the secondary particle dispersed liquid may have a solids content of 55 wt % or more and a viscosity of 15,000 to 20,000 cps at 25° C.

In an embodiment, the method may further include step (c) of feeding an additional polyol into the secondary particle dispersed liquid to lower the solids content and the viscosity at 25° C. to 35 to 55 wt % and 3,000 to 6,000 cps, respectively, after step (b).

In an embodiment, steps (a) and (b) may be carried out with a one-pot process.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
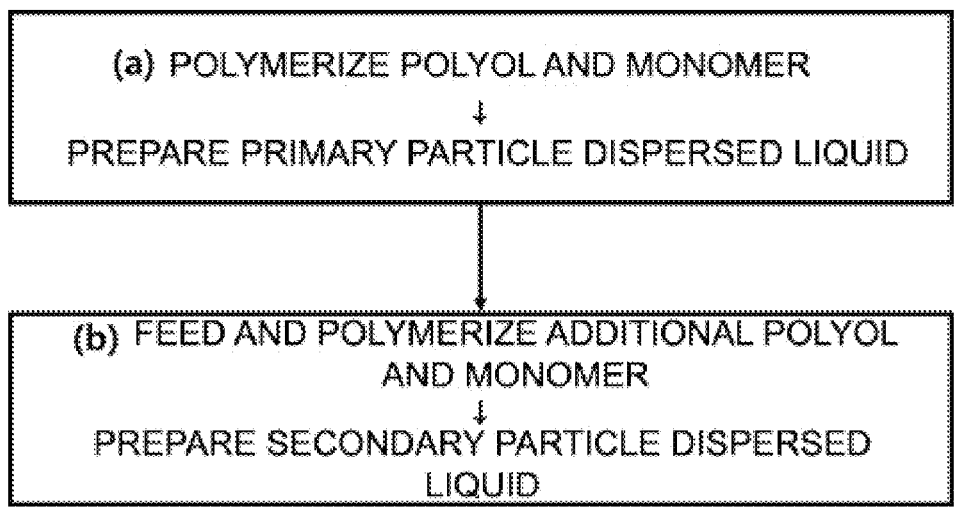
FIG. 1 illustrates a method of preparing a polymer polyol according to an aspect of the present invention.

Reference will now be made in detail to various embodiments of the present invention, examples of which are illustrated in the accompanying drawings and described below, so that a person having ordinary skill in the art to which the present invention relates can easily put the present invention into practice. The present invention, however, can be embodied in various different forms and is not limited to embodiments which will be described hereinafter. In addition, those parts which are not related to the description are omitted from the accompanying drawings in order to more clearly describe the present invention, and the same reference numerals and symbols are used throughout the specification in order to designate the same or similar components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, unless explicitly stated to the contrary, the term "include," "includes" or "including" used throughout the specification will be understood as including the possibility of the presence or addition of other elements and not excluding the other elements.

In the present invention, a "polymer polyol (POP)" is also referred to as a copolymer polyol (CPP), which is a product in which a predetermined content of a particulate organic or inorganic filler is dispersed in a base polyol in liquid phase. A polyol prepared by dispersing and polymerizing an acrylic monomer in a polyether polyol is also a type of the polymer polyol. It is widely used in various fields such as seats, bedding, automobile parts and the like for the purpose of increasing the hardness and air permeability of soft and semi-rigid polyurethane foam.

A "soluble oligomer" is a low molecular weight polymer produced by polymerization between some unreacted monomers, which causes degradation of the quality of polyurethane foam. For example, soluble oligomers may refer to dimers, trimers or tetramers.

"Polyurethane" is a polymer material having a large amount of urethane (—NHCOO) bonds, and is generally formed and processed into the form of foam, which is a honeycomb-shaped light material, through a polymer reaction generating bubbles and used. A "polyurethane foam" is usually classified as a flexible, rigid, and semi-rigid polyurethane foam.

Hereinafter, embodiments of the present invention will be described in detail with reference to the accompanying drawings.

FIG. 1 illustrates a method of preparing a polymer polyol according to an aspect of the present invention. Referring to FIG. 1, a method of preparing a polymer polyol according to an aspect of the present invention may include steps of: (a) polymerizing a polyol and a monomer in presence of a diluent to prepare a primary particle dispersed liquid; and (b) feeding an additional polyol and monomer into the primary particle dispersed liquid and polymerizing to prepare a secondary particle dispersed liquid.

As used herein, the term "primary particles" refer to particles formed by first polymerizing a polyol and a monomer. The primary particles have excellent steric stability, so that aggregation of solids due to collisions between particles and an abnormal increase in viscosity can be prevented.

As used herein, the term "secondary particles" refer to i) particles formed by polymerizing a polyol and a monomer in addition to the primary particles, ii) particles formed by polymerizing the polyol and the monomer separately from the primary particles, or iii) a mixture of particles formed by polymerizing a polyol and a monomer in addition to the primary particles and the particles formed by polymerizing the polyol and the monomer separately from the primary particles.

An average particle size of solids in the primary particle dispersed liquid may be 80 to 320 nm, and preferably, may be 100 to 300 nm. When the average particle size is less than 80 nm, the physical properties of the polymer polyol may be deteriorated. When the average particle size is more than 320 nm, aggregation of solids may occur.

In steps (a) and (b), the stability of the polymer may be improved during the preparation of the high solids content polymer polyol by feeding the primary particles and secondary particles of the polyol and the monomer in a distributed manner and then polymerizing.

A weight ratio of the monomer used in step (a) to the monomer used in step (b) may be 1:1 to 10.

When the weight ratio of the monomer used in step (b) is less than 1 based on 1 of the weight ratio of the monomer used in step (a), aggregation or an abnormal increase in viscosity may occur during the preparation of the primary particle dispersed liquid. When the weight ratio of the monomer used in step (b) is more than 10, aggregation or an abnormal increase in viscosity may occur during the preparation of the secondary particle dispersed liquid.

A weight ratio of the polyol used in step (a) to the polyol used in step (b) may be 1:1 to 5.

When the weight ratio of the polyol used in step (b) is less than 1 based on 1 of the weight ratio of the polyol used in step (a), the diameter of particles dispersed in the polymer polyol may be non-uniform such that the quality of polymer polyol is deteriorated. When the weight ratio of the polyol used in step (b) is more than 10, the amount of produced soluble oligomers may increase during the preparation of the primary particle dispersed liquid.

The monomer may include an aromatic vinyl monomer and an acrylic monomer.

The aromatic vinyl monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethyl ether, vinylpyridine, vinyl xylene, diphenylethylene, diphenylethylene including tertiary amines, styrene including primary, secondary, or tertiary amines, derivatives thereof and combinations of two or more thereof, and preferably, may be styrene, but is not limited thereto.

The acrylic monomer may be one selected from the group consisting of acrylonitrile, methacrylonitrile, ethacrylonitrile, methyl acrylate, ethyl acrylate, butyl acrylate, methyl methacrylate, ethyl methacrylate, butyl methacrylate, derivatives thereof and combinations of two or more thereof, and preferably, may be acrylonitrile, but is not limited thereto.

The polyol may be a polyether polyol, and the polyether polyol may have a weight average molecular weight of 1,000 to 5,000 g/mol. When the weight average molecular weight of the polyether polyol is less than 1,000 g/mol, the hardness of the polyurethane foam produced from the polymer polyol may be lowered. When the weight average molecular weight is more than 5,000 g/mol, the viscosity of the prepared polymer polyol may be excessively high.

The secondary particle dispersed liquid may have a solids content of 55 wt % or more, preferably of 55 to 80 wt %, and a viscosity of 15,000 to 20,000 cps at 25° C.

When the solids content of the secondary particle dispersed liquid is less than 55 wt %, the hardness of the polyurethane produced from the polymer polyol may decrease.

When the viscosity of the secondary particle dispersed liquid is less than 15,000 cps at 25° C., the hardness of the polyurethane foam produced from the polymer polyol may decrease.

When the viscosity is more than 20,000 cps, aggregation may occur during the preparation of the particle dispersed liquid.

Figure 2:
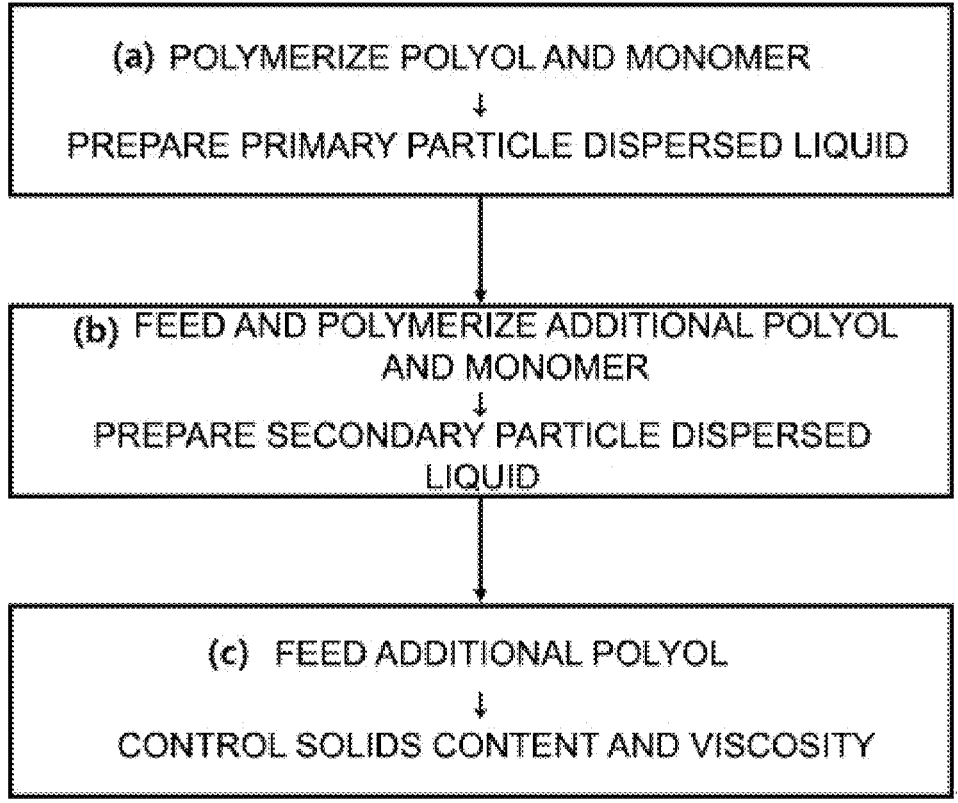
FIG. 2 illustrates a process of feeding an additional polyol in a method of preparing a polymer polyol according to an aspect of the present invention.

FIG. 2 illustrates a process of feeding an additional polyol in a method of preparing a polymer polyol according to an aspect of the present invention. Referring to FIG. 2, the method may further include step (c) of feeding an additional polyol into the secondary particle dispersed liquid to lower the solids content and the viscosity at 25° C. to 35 to 55 wt % and 3,000 to 6,000 cps, respectively, after step (b).

In step (c) as a process of feeding an additional polymer, the solids content of the polymer polyol and the viscosity at 25° C. may be controlled by changing the weight of the polyol fed into the secondary particle dispersed liquid. It is possible to effectively remove the soluble oligomers lowering the quality of the product by applying the process of feeding an additional polymer. It is possible to produce a polyurethane foam with higher quality than an existing polymer polyol having the same solids content and viscosity by using the polymer polyol prepared using the above-mentioned process of feeding an additional polymer.

Steps (a) and (b) may be carried out with a one-pot process.

Compared with an existing method of preparing a polymer polyol in which the primary and secondary particle dispersed liquids are prepared by seed polymerization in a separate process, the method of preparing a polymer polyol of the present invention is a one-pot process to which an in-situ method is applied, and thus enables cost reduction by simplifying a polymerization method.

Hereinafter, embodiments of the present invention will be described in more detail. However, the following experimental results are typical experimental results of Examples, and the scope and content of the present invention should not be construed as limited to the exemplary embodiments set forth therein. Each of the effects of various embodiments not specified hereinafter will be described particularly at the corresponding part.

The results of the following experiments are the results of comparative analysis of physical properties of the high solids content polymer polyol with low viscosity prepared according to an aspect of the present invention and the polymer polyol prepared according to an existing preparation method.

Raw Materials

The following compounds were used as raw materials to prepare a high solids content polymer polyol with low viscosity.

Base polyol: polyether polyol having a weight average molecular weight (Mw) of 3,000 g/mol and a viscosity of 500 cps at 25° C.

Polymerizable unsaturated monomers: styrene and acrylonitrile

Polymerization stabilizer: polymerization stabilizer in the form of terminal reactive macromonomer Polymerization initiator: azobisisobutyronitrile (AIBN)

Organic diluents: ethylbenzene (EB) and isopropylalcohol (IPA)

Example 1

987 g of styrene and 423 g of acrylonitrile as polymerizable unsaturated monomers and 14.1 g of a polymerization initiator were fed into a 4 L-continuous feed tank equipped with a stirrer and completely dissolved at 25° C. 771 g of a base polyol was fed into the continuous feed tank and stirred for 10 minutes to prepare a continuous feed mixture. Then, 210 g of styrene and 90 g of acrylonitrile as polymerizable unsaturated monomers and 3 g of a polymerization initiator were fed into a 4 L-reaction tank equipped with a stirrer and completely dissolved at 25° C. 114 g of a polymerization stabilizer, 405 g of a base polyol, and 450 g of ethylbenzene as an organic diluent were fed into the reaction tank and dispersed by stirring for 10 minutes. After dispersion was completed, the temperature of the reaction tank was elevated to 120° C. for 1 hour to polymerize primary particles having a particle diameter of 100 to 300 nm. The continuous feed mixture was then continuously fed into the reaction tank at a constant speed for 5 hours using a metering pump. After completion of feeding, polymerization was carried out at 120° C. for 1 hour to prepare a non-purified polymer polyol. The non-purified polymer polyol was transferred to a purification tank and vacuum degassed at 140° C. for 12 hours to remove unreacted monomers and the organic diluent. As a result, a polymer polyol having 57% solids was prepared. 560 g of the base polyol was additionally fed into the purification tank, and a mixture was stirred for 1 hour and further subjected to vacuum degassing to perform the secondary mixing process. As a result, a low viscosity polymer polyol having 48% solids was prepared.

Example 2

The preparation process was performed in the same manner as in Example 1 except that isopropyl alcohol was used instead of ethylbenzene as an organic diluent.

Example 3

A low viscosity polymer polyol having 45% solids was prepared in the same manner as in Example 1 except that 800 g of the base polyol was fed in the secondary mixing process.

Example 4

A low viscosity polymer polyol having 50% solids was prepared in the same manner as in Example 1 except that 420 g of the base polyol was fed in the secondary mixing process.

Comparative Example 1

1,197 g of styrene and 513 g of acrylonitrile as polymerizable unsaturated monomers and 17.1 g of a polymerization initiator were fed into a 4 L-continuous feed tank equipped with a stirrer and completely dissolved at 25° C. 300 g of a base polyol was fed into the continuous feed tank and stirred for 10 minutes to prepare a continuous feed mixture. Then, 114 g of a polymerization stabilizer, 860 g of a base polyol, and 450 g of ethylbenzene as an organic diluent were fed into a 4 L-reaction tank equipped with a stirrer and dispersed by stirring for 10 minutes. After dispersion was completed, the temperature of the reaction tank was elevated to 120° C. for 1 hour. The continuous feed mixture was then continuously fed into the reaction tank at a constant speed for 5 hours using a metering pump. After completion of feeding, polymerization was carried out at 120° C. for 1 hour to prepare a non-purified polymer polyol. The non-purified polymer polyol was transferred to a purification tank and vacuum degassed at 140° C. for 12 hours to remove unreacted monomers and the organic diluent. As a result, a polymer polyol having 57% solids was prepared.

Comparative Example 2

A polymer polyol having 48% solids was prepared in the same manner as in Comparative Example 1 except that 868 g of the base polyol was fed during the preparation of the continuous feed mixture.

Comparative Example 3

A polymer polyol having 45% solids was prepared in the same manner as in Comparative Example 1 except that 1,100 g of the base polyol was fed during the preparation of the continuous feed mixture.

Experimental Example 1

The physical properties of the polymer polyol prepared in Examples and Comparative Examples were evaluated, and the results are summarized in the following Table 1.

TABLE 1

| Classification | Type of organic diluent | Primary solids content (wt %) | Primary viscosity (cps) | Final solids content (%) | Final viscosity (cps) | Foam hardness (ILD 25) |
|---|---|---|---|---|---|---|
| Example 1 | EB | 57 | 15,000 | 48 | 5,200 | 42 |
| Example 2 | IPA | 57 | 17,000 | 48 | 5,300 | 41.2 |
| Example 3 | EB | 57 | 16,000 | 45 | 3,800 | 38.6 |
| Example 4 | EB | 57 | 15,500 | 50 | 5,900 | 44.1 |
| Comparative Example 1 | EB | — | — | 57 | Aggregated | Not evaluable |
| Comparative Example 2 | EB | — | — | 48 | 8,300 | 38.9 |
| Comparative Example 3 | EB | — | — | 45 | 4,900 | 35.1 |

In Table 1, the primary solids content and the primary viscosity respectively refer to the solids content and viscosity of the polymer polyol not undergoing the secondary mixing process in Examples 1 to 4. For the foam hardness, indentation load deflection (ILD 25) is a method for measurement of hardness, in which the polyurethane foam prepared by molding the polymer polyol in a 300×300×100 mm-mold is cured at room temperature for 1 day and then compressed to 25% and the force applied was measured, and the unit thereof is kgf/314 cm$^2$.

Referring to Table 1, it was confirmed that, when ethylbenzene was used as the organic diluent, the viscosity was lower and the foam hardness was higher than those in the case of using isopropyl alcohol.

Further, it was confirmed that, in Examples 1 to 4, in which the polymerizable monomers were fed in a distributed manner and the secondary mixing process was performed according to an embodiment of the present invention, higher foam hardness could be obtained at low viscosity compared with Comparative Examples 1 to 3 according to the existing preparation method.

Specifically, it was confirmed that, when Examples 1 and 2 and Comparative Example 2 with a solids content of 48% were compared, Examples 1 and 2 in which the viscosity was 5,200 to 5,300 cps and the foam hardness was 41.2 to 42 showed more excellent physical properties compared with Comparative Example 2 in which the viscosity was 8,300 cps and the foam hardness was 38.6.

It was confirmed that, when Example 3 and Comparative Example 3 with a final solids content of 45% were compared, Example 3 in which the viscosity was 3800 cps and the foam hardness was 38.6 showed more excellent physical properties compared with Comparative Example 3 in which the viscosity was 4,900 cps and the foam hardness was 35.1.

Referring to Comparative Example 1, it was confirmed that the polyurethane foam could not be produced due to occurrence of aggregation when the polymer polyol having a solids content of 55% or more was prepared according to the existing preparation method, but it was confirmed that the polymer polyol having a solids content of 55% or more could be prepared using a process of feeding polymerizable monomers in a distributed manner according to an embodiment of the present invention, and a polyurethane foam having low viscosity and high foam hardness could be produced through a secondary mixing process of the polymer polyol and the base polyol.

Experimental Example 2

Figure 3:
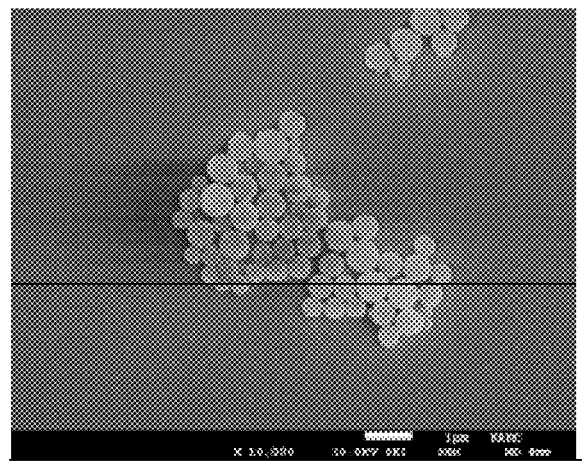
FIG. 3 is an image (1 μm) showing the result of observation of a polymer polyol prepared according to Example 1 of the present invention by scanning electron microscopy (SEM)
Figure 4:
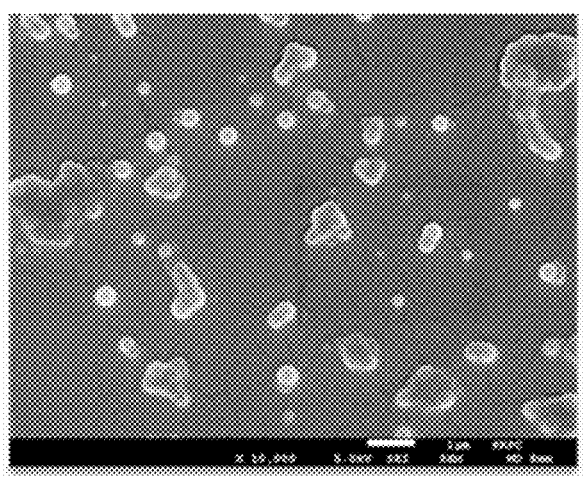
FIG. 4 is an image (1 μm) showing the result of observation of a polymer polyol prepared according to Comparative Example 2 of the present invention by scanning electron microscopy (SEM).

The polymer polyols prepared according to Example 1 and Comparative Example 2 having the same solids content were observed with a scanning electron microscope, and the resulting images (1 μm) are shown in FIGS. 3 and 4, respectively.

Referring to FIG. 3, it is confirmed that the formed particles have a uniform particle size. On the other hand, referring to FIG. 4, it is confirmed that particle size is not uniform due to aggregation among some particles.

According to an aspect of the present invention, a method of preparing a high solids content polymer polyol with low viscosity can be provided by using a process of feeding monomers in a distributed manner.

According to another aspect of the present invention, a method of preparing a polymer polyol capable of suppressing excessive soluble oligomer production and controlling the solids content and viscosity of the polymer polyol can be provided by using a process of feeding an additional polyol.

Effects of the invention are not limited to the effects mentioned above, and may include every effect capable of being inferred from the description or claims of the present invention.

The above description is only exemplary, and it will be understood by those skilled in the art that the invention may be carried out in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined not by the detailed description but by the appended claims, and encompasses all modifications or alterations derived from meanings, the scope and equivalents of the appended claims.

What is claimed is:

1. A method of preparing a polymer polyol, comprising the steps of:
   (a) polymerizing a polyol and a monomer in presence of a diluent to prepare a primary particle dispersed liquid;
   (b) feeding an additional polyol and monomer into the primary particle dispersed liquid and polymerizing to prepare a secondary particle dispersed liquid, wherein the secondary particle dispersed liquid has a solids content of 55 wt % or more and a viscosity of 15,000 to 20,000 cps at 25° C.; and
   (c) feeding an additional polyol into the secondary particle dispersed liquid to further lower the solids content and the viscosity at 25° C. to 35 to 55 wt % and 3,000 to 6,000 cps, respectively,
   wherein:
   steps (a) and (b) are carried out with a one-pot process, and
   in step (b), the additional polyol and monomer are continuously added.

2. The method according to claim 1, wherein an average particle size of solids in the primary particle dispersed liquid is 80 to 320 nm.

3. The method according to claim 1, wherein a weight ratio of the monomer used in step (a) to the monomer used in step (b) is 1:1 to 10.

4. The method according to claim 1, wherein a weight ratio of the polyol used in step (a) to the polyol used in step (b) is 1:1 to 5.

5. The method according to claim 1, wherein the monomer includes an aromatic vinyl monomer and an acrylic monomer.

6. The method according to claim 5, wherein the aromatic vinyl monomer is one selected from the group consisting of styrene, α-methylstyrene, 2-methylstyrene, 3-methylstyrene, 4-methylstyrene, 2,4-dimethyl styrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethyl ether, vinylpyridine, vinyl xylene, diphenylethylene, diphenylethylene including tertiary amines, styrene including primary, secondary, or tertiary amines, derivatives thereof and combinations of two or more thereof.

7. The method according to claim 5, wherein the acrylic monomer is one selected from the group consisting of acrylonitrile, methacrylonitrile, ethacrylonitrile, methyl acrylate, ethyl acrylate, butyl acrylate, methyl methacrylate, ethyl methacrylate, butyl methacrylate, derivatives thereof and combinations of two or more thereof.

8. The method according to claim 1, wherein the polyol is a polyether polyol.

9. The method according to claim 8, wherein the polyether polyol has a weight average molecular weight of 1,000 to 5,000 g/mol.

* * * * *